US012572382B2

(12) United States Patent
Valverde Alcala et al.

(10) Patent No.: US 12,572,382 B2
(45) Date of Patent: Mar. 10, 2026

(54) PROCESSOR SCHEDULING USING A CONTENTION MODEL

(71) Applicant: Collins Aerospace Ireland, Limited, Cork City (IE)

(72) Inventors: Juan Valverde Alcala, Munich (DE); Michele Garraffa, Bishopstown (IE); Javier Mora De Sambricio, Cork City (IE); Mohamed Wahbi, Carrigtwohill (IE)

(73) Assignee: COLLINS AEROSPACE IRELAND, LIMITED, Cork City (IE)

( * ) Notice: Subject to any disclaimer, the term of this patent is extended or adjusted under 35 U.S.C. 154(b) by 635 days.

(21) Appl. No.: 17/978,554

(22) Filed: Nov. 1, 2022

(65) Prior Publication Data

US 2023/0133943 A1 May 4, 2023

(30) Foreign Application Priority Data

Nov. 4, 2021 (EP) ..................................... 21206549

(51) Int. Cl.
*G06F 9/48* (2006.01)
*G06F 9/38* (2018.01)

(52) U.S. Cl.
CPC .......... *G06F 9/4881* (2013.01); *G06F 9/3838* (2013.01)

(58) Field of Classification Search
CPC .............................. G06F 9/4881; G06F 9/3838
See application file for complete search history.

(56) References Cited

U.S. PATENT DOCUMENTS

| | | | |
|---|---|---|---|
| 8,732,714 B2 | 5/2014 | Vaidya et al. | |
| 8,984,520 B2 | 3/2015 | Liu et al. | |
| 9,207,977 B2 | 12/2015 | Easwaran et al. | |
| 10,831,543 B2 | 11/2020 | Chandramoorthy et al. | |
| 2020/0026563 A1* | 1/2020 | Bahramshahry ...... | G06F 9/4887 |

FOREIGN PATENT DOCUMENTS

| | | |
|---|---|---|
| EP | 3104274 A1 | 12/2016 |
| WO | 2015099701 A1 | 7/2015 |

OTHER PUBLICATIONS

European Search Report for Application No. 21206549.4, mailed Apr. 4, 2022, 10 pages.

* cited by examiner

*Primary Examiner* — Wissam Rashid
(74) *Attorney, Agent, or Firm* — CANTOR COLBURN LLP

(57) ABSTRACT

A computer-implemented method schedules a plurality of tasks for execution by a multi-processor system. A first schedule is generated that assigns each task of the plurality of tasks a time window and a processor of the multi-processor system. A contention model for the multi-processor system is queried to determine a contention delay for the assignment of tasks to processors according to the first schedule. The contention delay determined from the contention model is used to generate, from the first schedule, a revised schedule that assigns each task a time window and a processor of the multi-processor system, wherein the revised schedule is determined in dependence on the determined contention delay.

15 Claims, 11 Drawing Sheets

PROCESSOR SCHEDULING USING A CONTENTION MODEL

CROSS-REFERENCE TO RELATED APPLICATIONS

This application claims priority to European Patent Application No. 21206549.4 filed Nov. 4, 2021, the entire contents of which is incorporated herein by reference.

FIELD

This invention relates to scheduling for processors using a contention model.

BACKGROUND

There has been a recent movement from single core processors to processors with multiple processing cores within the same processor device, which can provide a significant performance increase with a similar amount of power consumption.

As such, a wide range of multi-processor system-on-chip (MPSoC) architectures targeted for embedded applications have appeared on the market over the last years. This kind of SoC includes multiple processing cores, either homogeneous or heterogeneous, on the same die. Multi-core processors (MCP) with two or more processing cores overcome the frequency scaling, power consumption and heat dissipation problems associated with single core processors, all whilst the effective throughput is increased.

As such, MCPs have delivered significant performance improvements over traditional single-core processors. However, their use in safety-critical systems (such as avionics systems) poses some unique challenges that are otherwise not present in typical single-core processors, which otherwise run a single process at a time.

For efficiency, MCP designs include shared resources on the device. Processor cores in MCPs are typically tightly or loosely coupled, sharing intermediate memory systems (cache hierarchies) and interconnection buses in order to access main memory and external input/output (I/O) devices. MPSoC architectures, in order to simplify board layout design, integrate more components onto the device to reduce the physical footprint.

Depending on the hardware implementation, tasks running on different cores (i.e. different processes or threads) may share some of these resources while they are being executed. For example, FIG. 1 shows an example MPSoC 100 and the resources that are shared between four separate cores (Core0-Core3), specifically the four Level 2 cache banks (L2 Bank 0-Bank 3), which the cores access through a common crossbar via respective core/cluster interfaces (CCI), and the common bus interface unit (BIU), Interconnection Network (IN), three direct-memory access units (DMA0-DMA2) and memory (MEM). However, the simultaneous execution of tasks on a parallel computer architecture can cause contention in the form of delays accessing certain shared resources and thus interference and variability on their typical execution time. For example, in the MPSoC 100 of FIG. 1, contention is highlighted as occurring in the two L2 banks Bank 1 & 2, although it can of course occur in other resources at other times, depending on what tasks are being executed simultaneously. Contention can be a particularly serious issue when it comes to real-time and/or safety-critical systems.

In safety-critical applications, for example in avionics systems such as those for helicopters or other aircraft, there are specific requirements that stem from the concurrent performance of tasks in MCPs. These include application isolation and determinism. Application isolation relates to the separation of the tasks of one application from the rest of the running processes, e.g. to shield the application from exploits. Determinism is the property of, when given a particular input, always producing the same output, and always passing through the same sequence of states. Furthermore, in such situations and for certification, it is typically necessary to know the actual execution time of a given set of tasks, which cannot be known without knowing the structure of a MCP and any potential contention between the tasks.

In this way, when providing a MCP for safety-critical uses, it is generally necessary to ensure that multiple applications running on a single core do not interfere with another application's performance, and additionally that each core will execute its designated tasks in the proper sequence at all times, and within an acceptable time period.

Multi-core semiconductor manufacturers designing MCPs for the commercial market tend to optimize their processors for performance, not safety and isolation, and additionally do not tend to publish details of the internal structure of their MCPs. In this way, it is difficult to predict the kinds of scheduling conflicts that might occur. This can make it challenging to design software for execution by such processors, especially in safety-critical contexts.

Specifically, in the real-time embedded system realm for avionics, task interference due to the contention on shared resources poses a big challenge for determinism, and therefore, certification. The uncertainty of not knowing beforehand the actual execution time on an MCP hinders certification on the avionics scope, e.g. as detailed in the CAST-32A, MULCORS and ARINC-653 papers.

It is common to describe control systems using model-based design techniques (MBD), where a system is modelled as a network of interconnected data processing blocks (also referred to as tasks) that execute repeatedly and send data to each other. Two examples of such execution models are multi-periodic (MP), where each task is executed with a certain fixed periodicity, and synchronous dataflow (SDF), where a task is executed when data is available in all of its inputs.

Most general purpose modelling tools use multi-periodic execution models with configurable options about priorities, parallelization, etc. While this is very intuitive for algorithm designers, it can be problematic in that execution relationships amongst tasks are very often arbitrarily selected. Migrating these models, including behavioral and scheduling aspects, to a multi-core embedded computer is very challenging since the granularity of the tasks, proportionality amongst periods, feedback loops, etc. are typically not well optimized.

Therefore, whilst MCPs can advantageously execute tasks in parallel, such operation can result in some or all of the issues outlined above, e.g. delays or failures relating to contention, which must be avoided in safety-critical applications where tasks must be completed within a given time window.

SUMMARY

From a first aspect, there is provided a computer-implemented method of scheduling a plurality of tasks for execution by a multi-processor system. The method includes:

generating a first schedule that assigns each task of the plurality of tasks a time window and a processor of the multi-processor system; querying a contention model for the multi-processor system to determine a contention delay for the assignment of tasks to processors according to the first schedule; and using the contention delay determined from the contention model to generate, from the first schedule, a revised schedule that assigns each task a time window and a processor of the multi-processor system, wherein the revised schedule is determined in dependence on the determined contention delay.

From a second aspect, there is provided a computer system for scheduling a plurality of tasks for execution by a multi-processor system, wherein the computer system is configured to: generate a first schedule that assigns each task of the plurality of tasks a time window and a processor of the multi-processor system; query a contention model for the multi-processor system to determine a contention delay for the assignment of tasks to processors according to the first schedule; and using the contention delay determined from the contention model to generate, from the first schedule, a revised schedule that assigns each task a time window and a processor of the multi-processor system, wherein the revised schedule is determined in dependence on the determined contention delay.

From a third aspect, there is provided computer software comprising instructions which, when executed on a computer system, cause the computer system to schedule a plurality of tasks for execution by a multi-processor system, by: generating a first schedule that assigns each task of the plurality of tasks a time window and a processor of the multi-processor system; querying a contention model for the multi-processor system to determine a contention delay for the assignment of tasks to processors according to the first schedule; and using the contention delay determined from the contention model to generate, from the first schedule, a revised schedule that assigns each task a time window and a processor of the multi-processor system, wherein the revised schedule is determined in dependence on the determined contention delay.

From a fourth aspect, there is provided computer software comprising instructions for executing a plurality of tasks on a multi-processor system according to a schedule determined using any of the methods disclosed herein. The computer software may be stored on a non-transitory computer-readable medium.

Thus it will be seen that, in accordance with examples of the disclosure, a contention model for the target multi-processor system is queried dynamically in order to refine a generated task schedule—e.g. as part of a process for identifying a schedule with a lowered make-span, in order to improve the responsiveness of the multi-processor system. This contrasts with a naïve approach in which a schedule is generated in a single step, trying to take account of all available parameters of the target multi-processor system. Such an approach can rapidly become infeasible as the number of tasks and number of processors (e.g. cores) increases. Dynamic querying, by contrast, can provide the scheduler with contention delay information that is specific to a particular proposed assignment of tasks to processors, and therefore provides a much more scalable approach.

The first schedule may be a schedule that does not account for contention delays in the multi-processor system. It may be generated using any appropriate scheduling techniques, e.g. using techniques known in the art.

The revised schedule may have a lower make-span that the first schedule.

The revised schedule may be an intermediate schedule or a final schedule. It may be a final schedule that is stored or output for use in executing the plurality of tasks on the multi-processor system. However, some example methods comprise iteratively generating a succession of revised schedules from the first schedule (i.e. a sequence of two or more revised schedules). Each revised schedule may be generated from a respective preceding schedule by querying the contention model to determine a respective contention delay for the assignment of tasks to processors according to the preceding schedule; and using the determined contention delay to generate the schedule in dependence on the determined contention delay.

Methods may comprise determining whether a generated schedule accounts for all contention delays that arise from the schedule. They may comprise iteratively generating revised schedules until a schedule is generated that accounts for all contention delays. Further generation of schedules may be ceased upon such a determination being made. Such a schedule may be identified as a final schedule, which may be output or stored for use in executing the plurality of tasks on the multi-processor system.

The contention model may be queried to determine a plurality of contention delays for a particular schedule. The plurality of contention delays may be provided in response to different respective queries, or in response to a single query.

Querying the contention model may comprise sending a single query or a plurality of queries. Each query may identify at least a first task and a second task, being tasks that are assigned to a common time window on different respective processors of the multi-processor system, according to the first schedule. In some embodiments, each query may identify only a single pair of tasks, while in other embodiments at least some queries may identify a plurality of tasks.

The contention model may be a task contention model (TCM). It may be extracted from the multi-processor system. It may model delays in any resource or resources of the multi-processor system, including any one or more of: cache contention, volatile-memory (e.g. RAM) contention, non-volatile memory (e.g. disk) contention, bus contention, and peripheral contention. The contention model may be generated in any appropriate way, which may include conventional or novel approaches. It may be built by hand or using automated methods. It may be determined using microbenchmarks (μBenchmarks) and/or hardware performance monitoring counters (PMCs). It may be determined using machine-learning processes, e.g. as described in more detail below.

The contention delay determined by the contention model may represent a worst-case execution time (WCET).

The contention model may comprise contention-model data stored in a memory of the computer system. It may provide or support a query interface for receiving a query and for returning a response to the query. The query interface may be an application-programming interface (API). The computer system may provide a scheduling solver configured to generate schedules as disclosed herein. The scheduling solver and contention model may be linked as a single executable or they may be separate executables. They may be provided by a single processor or computer or by different respective processors or computers of the computer system.

The contention model may, in some examples, be provided by a contention model system that comprise a cache for caching queries made to the contention model and responses from the contention model. The contention model system may be configured to determine whether a received query has been cached (i.e. is a repeat of an earlier query) and to respond with a contention delay retrieved from the cache when the query is determined to be cached. This can improve the efficiency of the scheduling process.

The schedules may be represented by any suitable data structure, and references herein to a schedule may encompass any data representative of a schedule. A schedule may be stored on a storage medium, such as in a volatile or non-volatile digital memory, and may be sent or received over any communication medium such as a bus or network.

The plurality of tasks may be tasks of a software application, which may be a real-time software application.

A final schedule (being the revised schedule or a further revised schedule) may be output to a memory or over a communication (e.g. network) interface. The final schedule may be used to configure a hypervisor or operating system for the multi-processor system, or may be used to control the execution of the plurality of tasks on the multi-processor system in any other appropriate way, e.g. by using an interrupt service routine. The final schedule may be sent to a compiler for compiling into a software application for execution by the multi-processor system, whereby the software application includes hypervisor or operating system configuration information according to the final schedule. The compiler may be provided by the computer system, or it may be implemented on a distinct computer system.

The computer system for scheduling the plurality of tasks may comprise one or more processors and a memory storing software for execution by the one or more processors. The software may comprise instructions for scheduling the plurality of tasks according to any of the methods disclosed herein.

The multi-processor system may be a multi-core processor (i.e. a single semiconductor chip) or it may comprise a plurality of networked processors (e.g. a plurality of semiconductor chips). It may be an avionics system, e.g. located on an aircraft. It may comprise any one or more of: a cache, a memory, a bus, a peripheral (e.g. an input or output port), that is shared between a plurality of processors (e.g. cores) of the multi-processor system. The contention model may model contention delays in any of these resources.

Where reference is made to different examples or sets of examples, it should be understood that these are not necessarily distinct but may overlap. Features of any example described herein may, wherever appropriate, be applied to any other example described herein.

BRIEF DESCRIPTION OF THE DRAWINGS

Certain examples of the disclosure will now be described, by way of example only, with reference to the accompanying drawings, in which.

6

Figure 7:
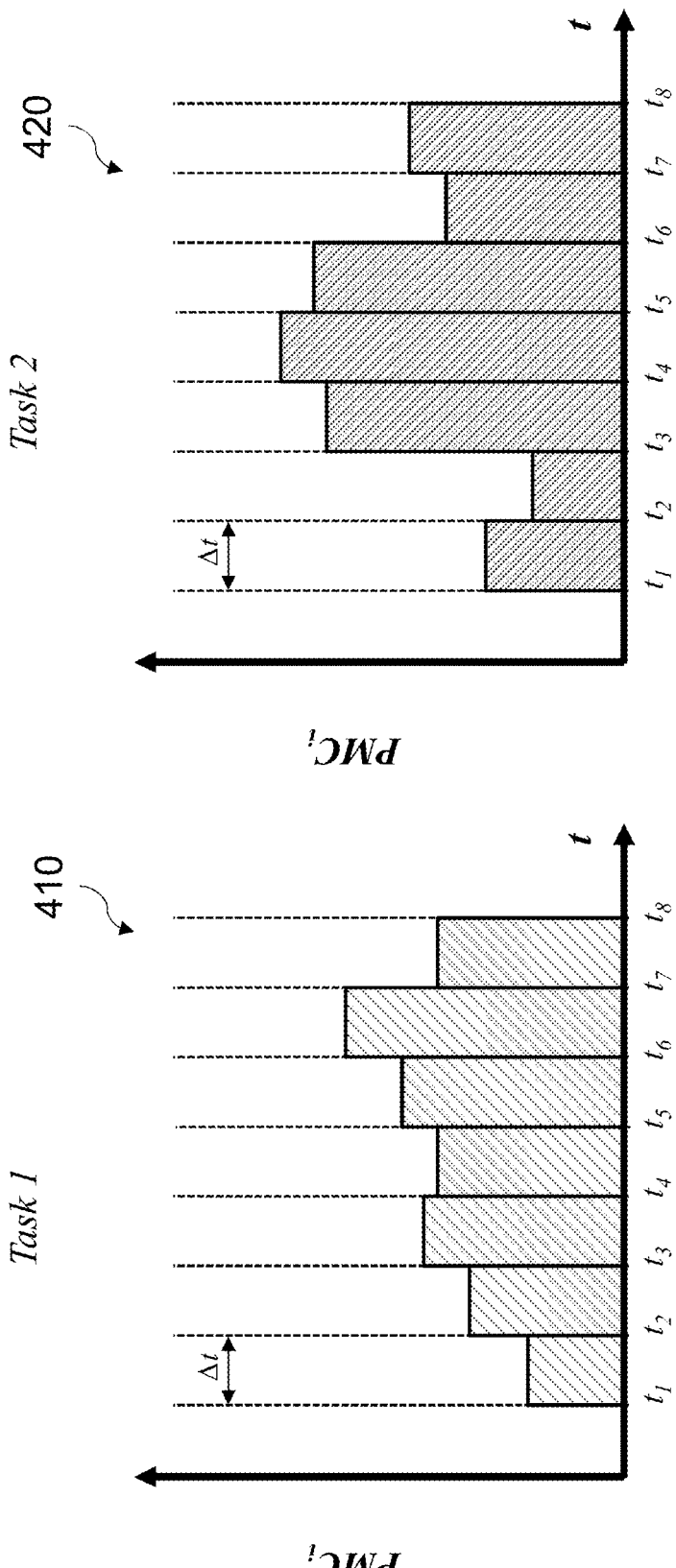
Figure 8:
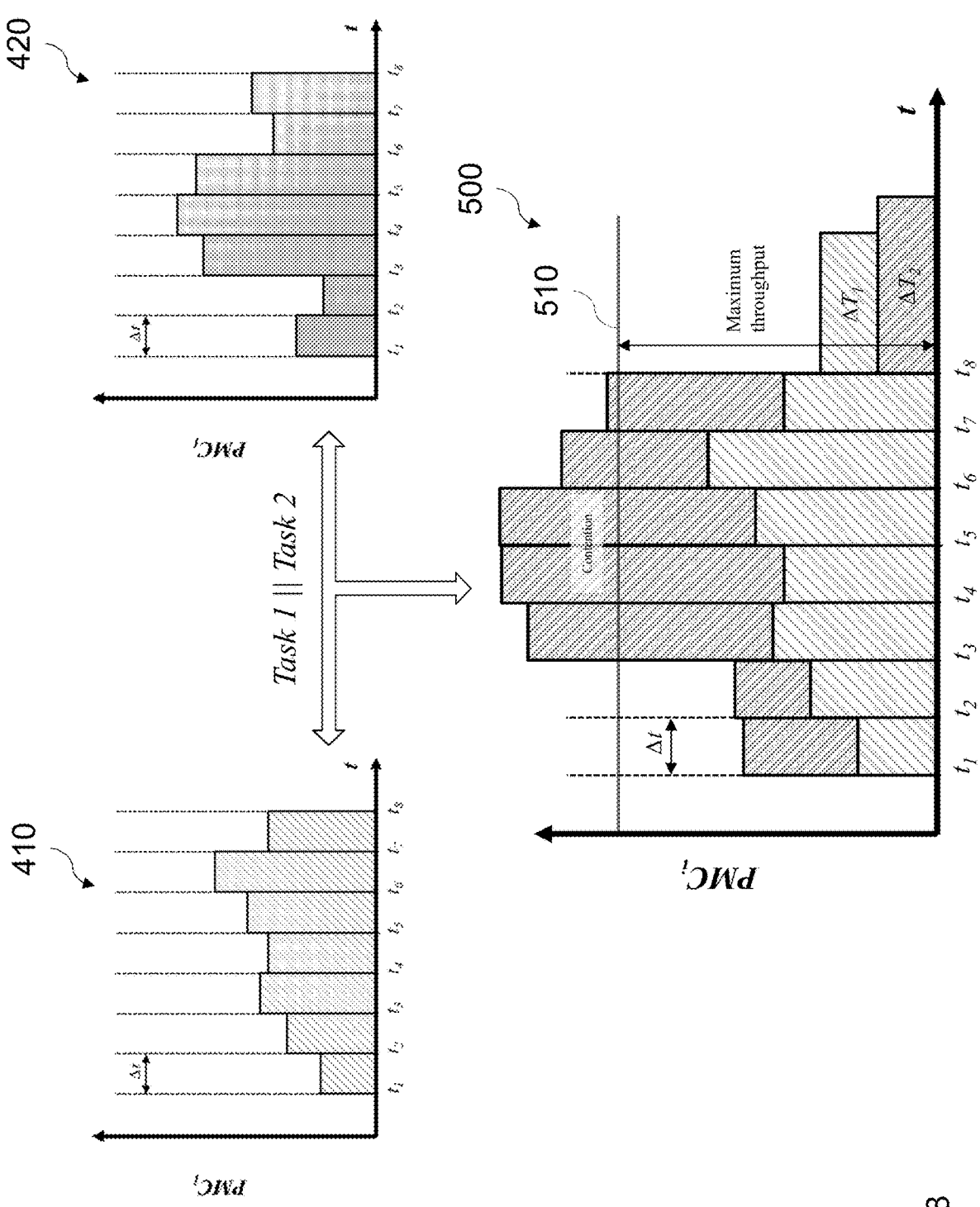
Figure 9:
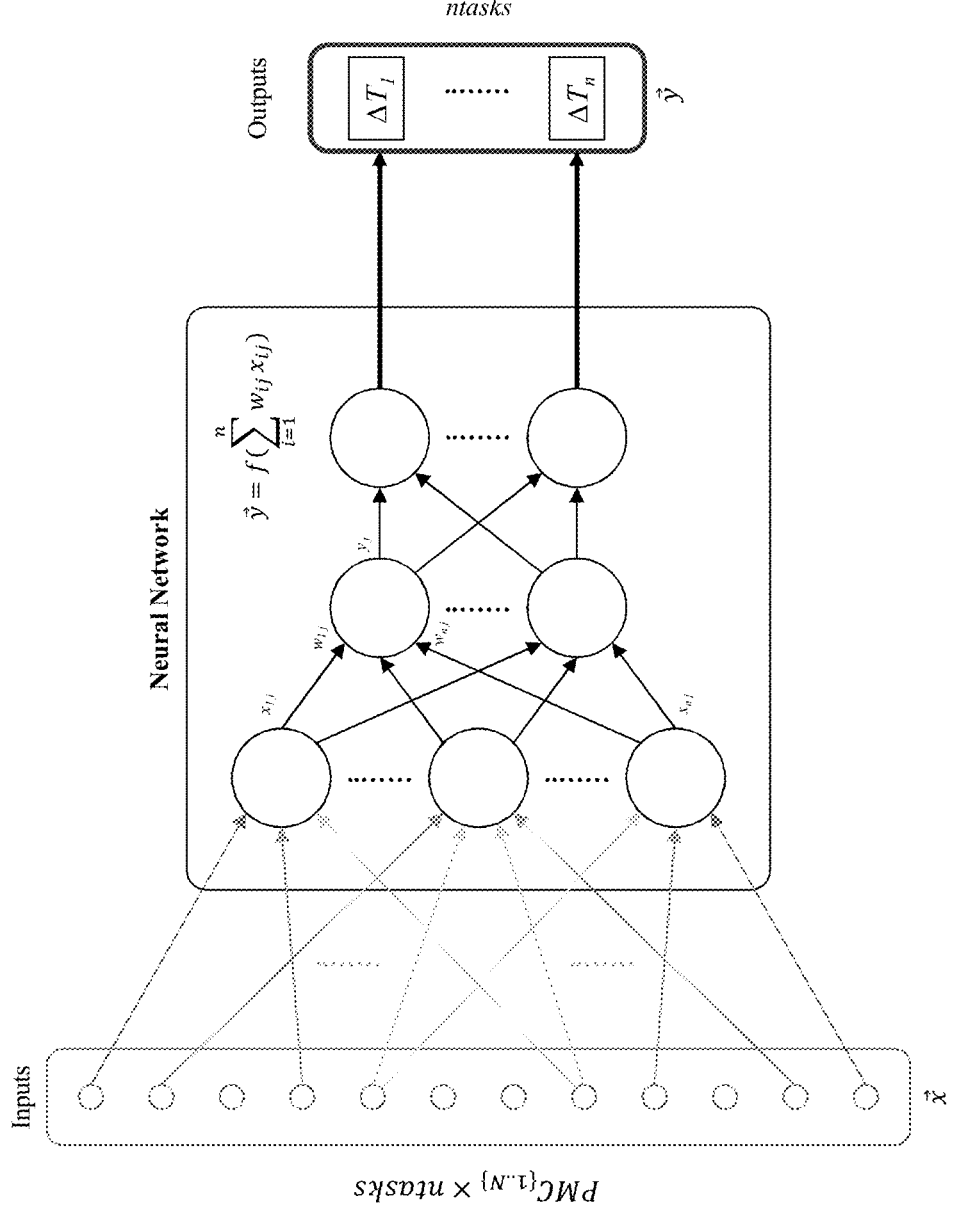
Figure 10:
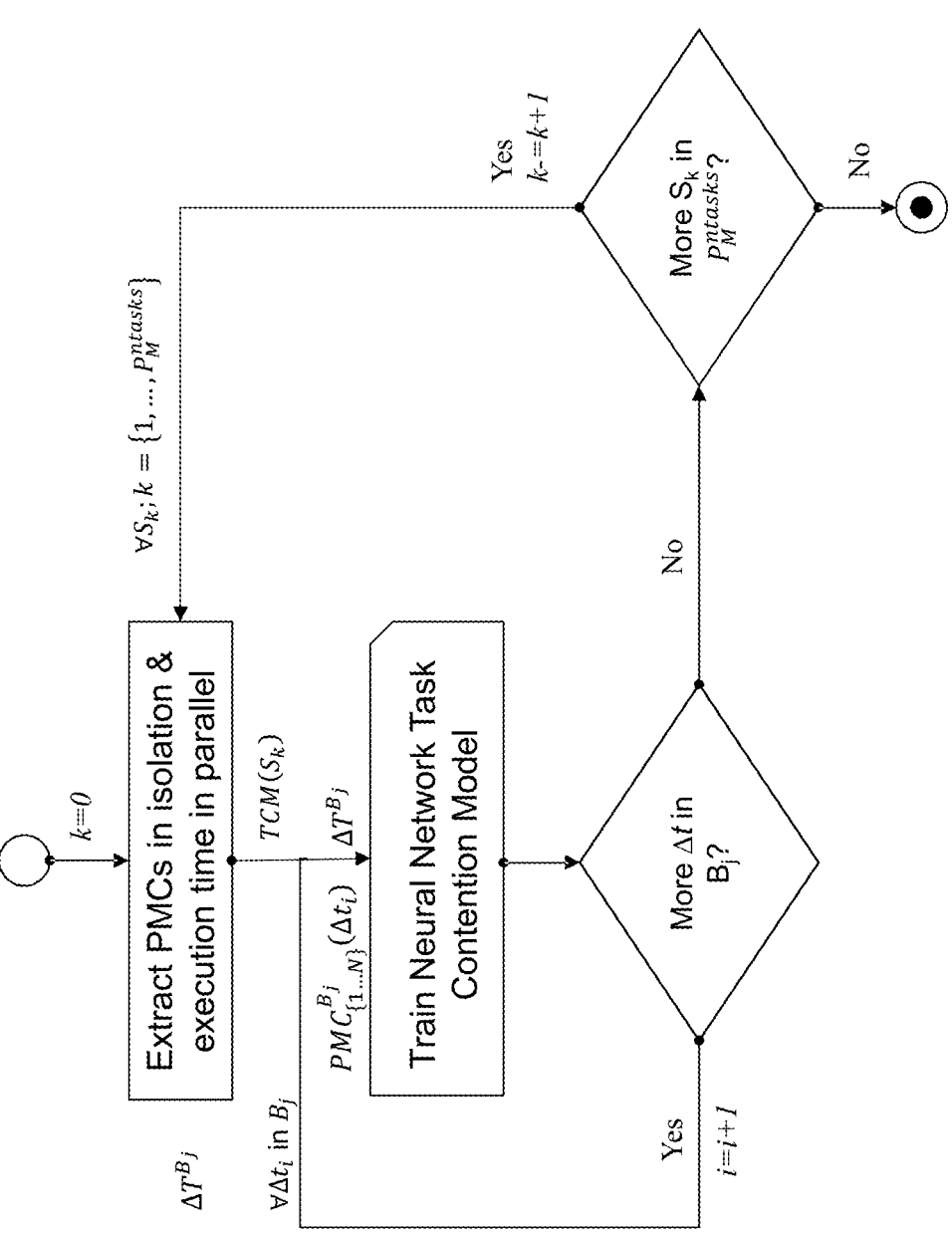

FIG. 7 shows example PMC profiles that are gathered for two different tasks as a function of time;

FIG. 8 shows the contention effect produced due to the execution in parallel of two tasks;

FIG. 9 shows example inputs and outputs for a neural network topology proposed for a ML-based TCM;

FIG. 10 shows an example training loop for a ML-based TCM; and

Figure 11:
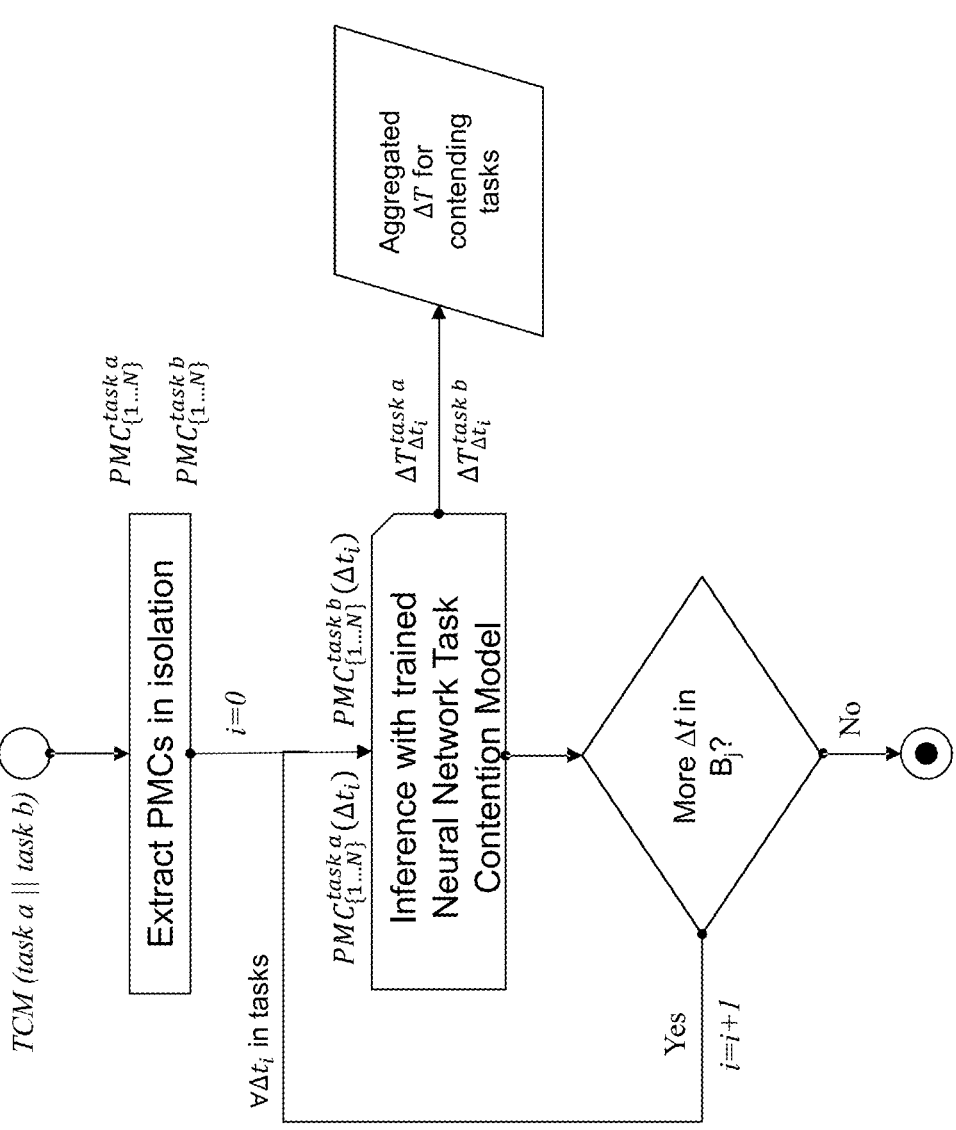

FIG. 11 shows an example inference loop for a ML-based TCM.

DETAILED DESCRIPTION

Whilst the methods and systems herein may be described with regards to a multi-core processor (MCP), it would be appreciated that the teaching herein is not limited to only a single processor with multiple cores, but also other multiple processing systems, such as a network of separate processors (i.e. multi-processor systems).

Figure 2:
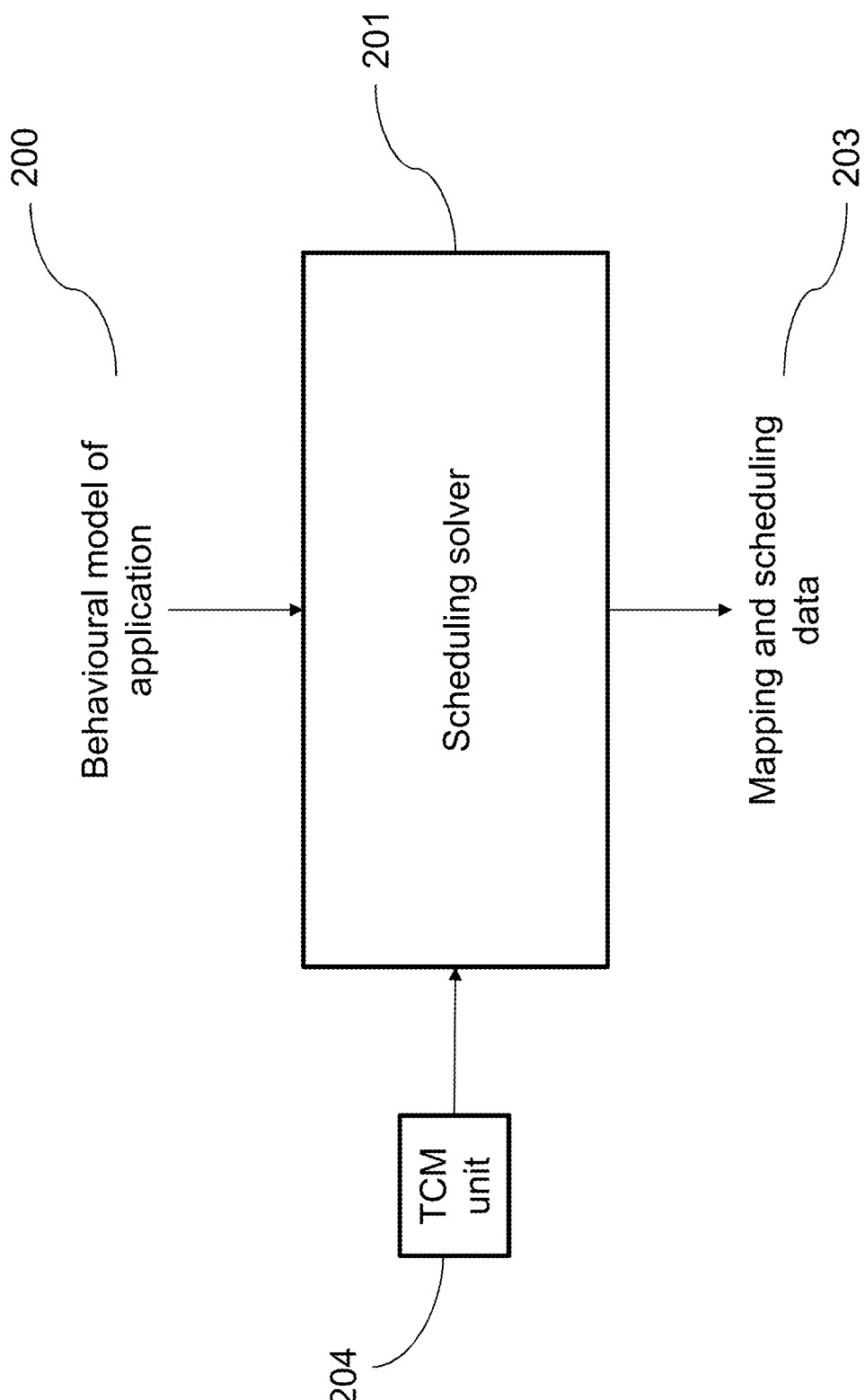
FIG. 2 is a schematic diagram of a system for producing software for a MCP.

For implementation on a given MCP architecture, the tasks of a control system need to be scheduled and mapped to respective cores, e.g. using a system as shown in FIG. 2, in order to generate software that can be executed on the particular MCP (e.g. within an aircraft). In the example of FIG. 2, a behavioural model (i.e. an execution model) of an application 200 is provided as input to a scheduling solver 201, which outputs mapping and scheduling data 203 that can be used in producing executable code for execution on multi-core processors.

In the context of MCPs, the scheduling solver 201 determines a time-partitioned schedule, which schedules executing tasks in synchronized time windows in order to guarantee a certain level of isolation. This is a static approach where tasks are mapped to a per-core "ready" queue prior to scheduling and cannot migrate between cores. However, even with such isolation, contention delays still occur in multi-core systems due to the concurrent accesses to shared resources by tasks executed concurrently in the same or different partitions. It is difficult to predict the delays that will result from such contention delays due to the high number of possible core and task combinations, which lead to different delay values. These delays should be considered when computing schedules where the make-span (i.e. total execution time) is to be minimized.

It is possible to approximate contention delays by extracting a task contention model (TCM) from the hardware platform, and inputting delays determined from this model into the scheduling solver 201. In order to shed some light on the predictability of Real-Time applications on MCP architectures, TCMs can be built to help estimate the worst case execution time (WCET) for each possible set of contending tasks depending on the final task-to-core mapping.

Here, a TCM 204 receives, as an input, execution footprints of a set of tasks to be executed in parallel on the MCP architecture (for example, the use pattern of interference channels as cache, buses, ports and I/O devices). Then, as an output, the TCM 204 generates the tasks' WCETs when they contend with their pairwise tasks running at the same time in parallel on the MCP architecture.

An issue that exists with this is that a simplistic scheduling solver would require all the possible delays to be provided as an input all together, if the scheduling solver is to take the possible contention delays into account. This is not generally feasible when considering MCPs, due to the high number of possible assignments of tasks to cores, which all lead to different delay values. In MCPs, not only scheduling but also task mapping to cores is required.

Therefore, depending on the mapping, communication mechanisms and data dependency amongst tasks will vary which makes it very difficult or infeasible to have all combinations precalculated.

Figure 3:
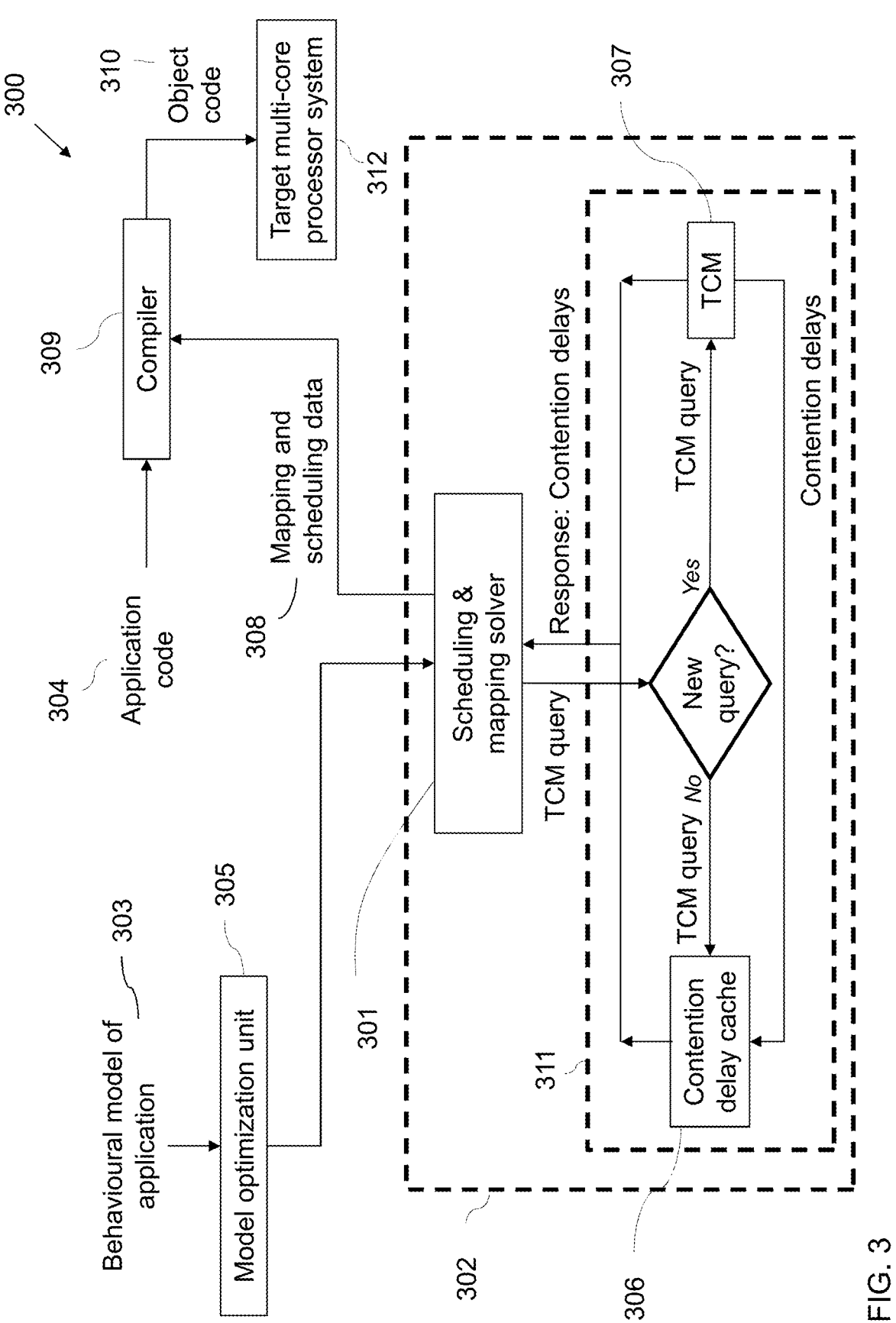
FIG. 3 is a schematic diagram of a system for producing optimised software for a MCP.

FIG. 3 shows a software-development system 300 for compiling software for execution on a target MCP 312. The development system 300 may be executed on a workstation or other computer processing system as part of a software development processor. The target MCP 312 may be located on an aircraft, for example. The development system 300 includes a scheduling system 302 for scheduling tasks that mitigates the above issues. Such an MCP 312, located with the optimised software, may then be used in safety-critical applications, such as within avionics.

As above, control systems are often described using MBDs, which typically tend to be multi-periodic execution models. These present problems in migrating the models onto a MCP, as they are not well optimised for parallel operation. Therefore, in order to optimise the models for parallel operation, the tasks that make up a behavioural model 303 (e.g. a task graph) for the application 304 are optionally factorized and/or reordered in a model-optimization unit 305, to translate a multi-periodic (MP) task graph into a synchronous dataflow (SDF) task graph, or to optimize an existing SDF model. Whilst such optimization finds particular use in the MCP space (such as in the example of FIG. 3), such approaches may also be applicable to any embedded system or other multi-processor system, and not only in a MCP, as many systems can be improved by a more efficient execution model.

Essentially, factorising and reordering the behavioural model 303 of the application 304 allows for the provision of an improved execution model (i.e. task graph) in which tasks have been modified such that they can be scheduled in a more efficient manner. The resulting model can be more easily mapped and scheduled to the cores of the MCP 312, resulting in more efficient utilisation and potentially concurrent usage of the multiple cores, whilst still resulting in the same outputs as the original model, but in a reduced time and with fewer constraints. The maintenance of the behaviour of the original model means that all tests and analysis performed in the original model (such as simulations) will still be valid for the transformed model, so they do not need to be repeated, reducing the production time.

As can be seen in FIG. 3, the factorized execution model 303 may be provided to a scheduling-and-mapping solver 301 in the scheduling system 302. Of course, any model (whether optimised in unit 305 or not) may be provided to the solver 301, although an optimised model may result in a faster implementation that is more likely to meet timing requirements.

In order to mitigate the issues described above regarding the prior calculation of, and concurrent provision of, all delays as an input to a scheduling solver, the scheduling system 302 of FIG. 3 provides a communication interface between the scheduling-and-mapping solver 301 and a TCM system 311 (which contains a TCM 307).

Such an interface finds use whatever optimization technology is implemented in the solver 301. The solver 301 may be an exact solver (e.g. that uses mathematical programming or constraint programming), or an approximate solver (e.g. that uses metaheuristics).

Given the execution model (e.g. SDF task graph) 303 at its input, the scheduling-and-mapping solver 301 generates an initial schedule without taking into account any contention delays. Rather than having to anticipate all possible contention delays from all conceivable pairs of tasks and cores in advance, the solver 301 then dynamically queries the TCM system 311 once its optimizer proposes a solution where no delays have been taken into account.

The TCM can support queries as to the delay for a given pair or larger set of contending tasks that execute in a single time frame, or equally the delay for a given sequence of pairs/set of contending tasks. However, the dynamic querying of the solver 301 of the TCM system may allow for the solver 301 to more rapidly converge on an acceptable solution as the delay for an isolated pair/set of contending tasks can be calculated, as and when the solver 301 considers the concurrent scheduling of said tasks.

In response to such a TCM query, the TCM system 311 then calculates the delay that is associated with the proposed solution. It returns these contention delays to the solver 301.

For a proposed solution, all of the pairs or sets of tasks running in parallel are given to the TCM in order to calculate the corresponding delays, then these delays need to be added to the time calculated in the scheduling (to each corresponding task). When these delays have been taken account, the proposed solution can be checked such that the deadlines and makespans are still accomplished. If such deadlines would be missed with the proposed solution, then the solver 301 needs to reiterate and propose a new solution. A new solution may require a change in mapping (i.e. pinning tasks to a different core (where possible)), and/or a change in scheduling (i.e. to reorder the execution of these tasks on the cores to reduce contention).

The optimization process then continues iteratively by the solver 301 considering the generated delays and computing new solutions. The first solution where all the delays are taken into account and which meets any required deadline and makespan conditions (e.g. having a total makespan that is below a predetermined maximum) may be provided as an output 308. Such a pseudo-optimal solution, given that it meets all deadlines, may then be implemented on the target MCP system. Of course, as this process is iterative, the solver 301 may in some examples continue further in order to find a better or best solution, with a shorter or shortest possible makespan.

Optionally a caching mechanism is implemented by the TCM system 311 in order to minimize the queries performed to the actual TCM 307 (i.e. the underlying contention-model data and the interface to it), as shown in FIG. 3. This avoids performing the same TCM query multiple times, so as to improve the processing efficiency of the scheduling system 302. Solutions proposed by the scheduling solver 301, and their associated response from the TCM 307, are stored in a contention delay cache 306 within the TCM system 311. Any subsequent query that is received from the scheduling solver 301 is compared to the existing contention delay cache 306, and, if the query has already been made, the corresponding contention delay is retrieved from the cache 306, as opposed to re-querying the TCM 307.

With such an interfacing between a task contention model system 311 and a scheduling/mapping solver 301, the scheduling system 302 is able to take all of the parameter values as an input, whilst avoiding a complete enumeration of all possible contention delay values. This makes the scheduling system 302 much more scalable with increasing numbers of cores and tasks.

As mentioned above, such a framework can be implemented in different types of real time critical systems where minimizing the make-span brings an improvement in terms of system responsiveness.

Once an acceptable solution is found, the scheduling solver 301 may output a corresponding set of mapping and static scheduling data 308. This data 308 may be input to a compiler 309 or other component of a real-time operating system (RTOS) or hypervisor toolchain, along with application source code 304, to generate object code 310 for executing the application tasks on appropriate cores of the target multi-core system 312, such as a system within an aircraft.

A CP-Based Scheduling Solver

One approach for the optimization process within the scheduling-and-mapping solver 301 is a Constraint Programming (CP) approach. In CP, as opposed to imperative programming which defines a step or sequence of steps to a solution, a problem is modelled in terms of the constraints to a solution that is to be found. This is particularly effective in the context of synchronized time-partitioned scheduling in multi-core systems, due to the high number of side-constraints that are to be taken into consideration. This allows a more modular design, easily adaptable to changing conditions in the models.

As discussed, the scheduling solver 301 not only defines a schedule but also maps tasks to cores. When using a CP approach, the possibility of executing a task in a core may be modelled as an optional interval variable. Such optional interval variable is then linked with a unique interval variable per task, which is non-optional, since each task should be executed at least once. An alternative constraint is then imposed on all the optional interval variables to ensure exactly one task is scheduled and synched with the non-optional one. The non-overlapping condition can be easily translated into a disjunctive global constraints on the interval variables related to executing tasks on the same core. Precedencies among tasks are modelled by means of specific temporal constraints. The tasks-related interval variables is then linked to interval variables representing time-partitions, which include delays as well.

Such an approach may also dynamically take into account a global constraint called TCMDelays (for example, as dynamically retrieved from the TCM 307 as described above). This allows the CP scheduler 301 to be designed in order to compute such intra-partition delays dynamically, by calling an external module only when needed. Additionally, a search heuristic is guiding the solution search efficiently, by including sequence variables induced from non-overlapping constraint and then based on the task early start and precedencies.

The objective function on which the search is based is the minimization of the make-span to guarantee safety-linked deadlines Task Factorization As above, a suitable behavioural execution model 303 for inputting to the scheduling system 302 is a synchronous dataflow (SDF) model, where the only concern is whether the data that is needed for a particular task to be performed is present. Such data can appear in the form of exchanged messages amongst tasks, or even state amongst different executions of the same task.

By properly dimensioning buffers between tasks, execution reordering is possible even amongst different executions of the same task. This provides enormous flexibility for optimizing the mapping and scheduling algorithms implemented by the scheduling-and-mapping solver 301.

The more constraints that are imposed on an optimization problem, the less efficient it will be (both in terms of completion time and of quality of obtained result), and so it is desirable to identify and relax these constraints. Furthermore, it is not unusual to have systems forming closed loops, where task dependencies form directed cycles (the input of a task indirectly depends on an output of the same task). In principle, this results in the contradiction that the task cannot be executed until it has been executed, making the task scheduling impossible. Even without closed loops, having an excessively constrained problem may not fully leverage the capabilities of a multicore platform, meaning that some of the cores are idle most of the time.

Such a situation may be mitigated or solved, in examples of the software-development system 300, by using the concept of direct feedthrough (DFT) for efficiently reordering tasks without changing the overall behaviour of the model. Such reordering may be performed in the model-optimization unit 305 to support more efficient scheduling by the scheduling system 302, and/or the model-optimization unit 305 may generate constraint information that it passes to the scheduling system 302 to facilitate reordering of tasks by the scheduling system 302. Further improvements may be realised by factorizing tasks in the model-optimization unit 305, as explained below.

The model-optimization unit 305 may thus be configured to identify which tasks in the model 303 have DFT and which do not have DFT. This knowledge can then be used to perform effective reordering of the tasks. This is based on the insight that, for non-DFT tasks, the output of the task does not depend directly on its input but rather only on an internal state (i.e., the task is a Moore machine) and so the output can be computed before the task has a valid input, since the next input will only affect a later output. The computation of the next internal state can be postponed until the next input is available. A non-DFT task is therefore a candidate for reordering (i.e. changing its position to be further upstream or downstream relative to other tasks in an SDF model). This is not the case for DFT tasks, where the input has an immediate effect on the output (i.e. a Mealy machine), and the input must be valid before the output can be computed. In the latter case, it can be said that there is a direct feedthrough (DFT) between input and output. Because of this, a DFT task cannot, in general, be reordered.

If a DFT task has multiple inputs or multiple outputs, it may exhibit DFT fully (with every output being directly affected by at least one respective input) or it may exhibit DFT partially (with at least one output that is directly affected by an input and with at least one further output that is not directly affected by any input). Such partial DFT tasks still cannot, in general, be reordered.

Non-DFT tasks are necessarily stateful, but a DFT task may be stateful or stateless. The model-optimization unit 305 may also be configured to identify which tasks of the model 303 are stateful and which are stateless. This knowledge can then be used to address the challenge of factorizing tasks—that is, translating from a multi-periodic (MP) model 303 approach (e.g. as may be received at the input of the model-optimization unit 305), to a mono-periodic model, such as an equivalent SDF version of the model 303 (e.g. as may be output by the model-optimization unit 305 to the scheduling solver 301).

Consider, for example, two tasks A and B with periods of 3 seconds and 2 seconds respectively that may be implemented in a hyper-period of 6 seconds in which A is executed twice and B three times. In this case, handling A and B as if they were five independent tasks {A1, A2; B1, B2, B3} may result in incorrect scheduling if either task has a state: for example, if A has a state then A2 must always follow A1, just as if there were a dependency from A1 to A2; however, this is not the case if A has no state. This demonstrates how identifying which tasks have a state and which do not can allow for optimal relaxing of the constraints provided to the scheduling optimization solver 301, to enable more efficiency scheduling, e.g. to yield a shorter make-span and improved real-time responsiveness to the target MCP system 301.

Direct Feedthrough Analysis

This part of the model-optimization unit 305 analyses the behaviour of each subsystem (task) in terms of internal delays, in order to obtain a correspondence matrix of which task inputs have DFT on which task outputs. This may be achieved in one of two ways: by recursively analysing the structure of each subsystem in search for elemental blocks known to have delayed feedthrough and studying its propagation with the help of directed graph analysis tools, or by short-circuiting input-output pairs one by one (feeding one output directly to one input) and relying on algebraic loop detection tools to determine if this forms a closed algebraic loop (which would indicate that there is DFT from the input to the output).

Knowing which task inputs need to be available before a task can be executed gives useful information on how task execution can be safely reordered. Using such information, the model-optimization unit 305 may perform the reordering, and thereby provide a reordered model to the solver 301. Alternatively, or additionally, the information may be provided to the solver 301, such that the solver 301 may also perform the reordering (or perform further reordering) as part of its scheduling. However, in order to preserve an identical behaviour after any reordering, relevant internal delays may be identified, extracted and adjusted, as further discussed below.

Model Transformation with Internal Delay Relocation

The execution model 303 for the software application may be received as a MP model. This models the periodic system as a set of interconnected tasks that run once in each period. It is important that all tasks run in order of precedence—e.g., if task B uses data computed by task A, then task B needs to be executed after task A in each period; if B were executed before A, it would be getting data from the previous period instead of the current one. However, if B contains a one-period delay immediately at its input, this misbehaviour could be solved by simply removing that delay. Nevertheless, this requires the unit delay to be immediately at the input, which might not always be the case. To address this, the model-optimization unit 305 can identify internal delays and first move them to be adjacent an input to the task (or, in some examples, adjacent an output of the task), from where they can then be moved out of the task altogether.

Figure 4:
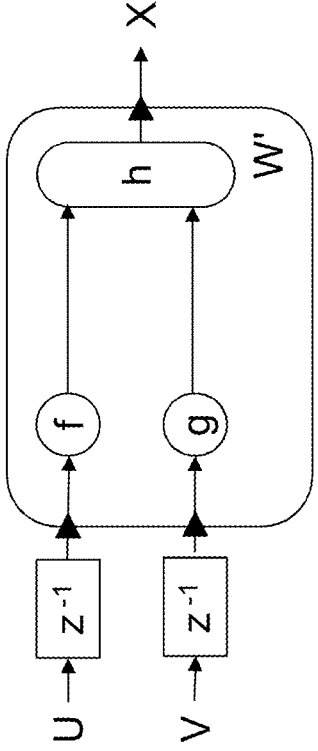
FIG. 4 is a schematic diagram of an exemplary task before (on the left) and after (on the right) internal delay relocation.
Figure 4:
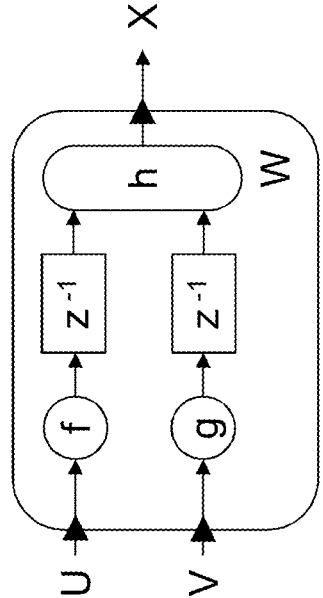

FIG. 4 illustrates the action of the DFT analysis and subsequent delay relocation, performed by the model-optimization unit 305, on an exemplary non-DFT task W (containing logic blocks f, g and h) that receives input from tasks U and V and outputs to a task X. The model-optimization unit 305 identifies a delayed feedthrough between inputs U & V and output X (shown on the left of FIG. 4). It modifies the internals of task W so as to allow delaying of the execution of the tasks upstream of the inputs from U & V without altering the overall behaviour of the system. In this example, the task W is replaced by an equivalent task W' (shown on the right of FIG. 4) in which the delays have been translocated out of the task inputs and embedded into the respective incoming communication channels.

In order to fully leverage the DFT analysis for task reordering, the task model is transformed more widely, so that such internal task delays are translocated across the internal hierarchy of each relevant task, until eventually being moved to the input (or, alternatively, the output) and finally out of the task. The unit delays extracted from this and other tasks may be embedded into the communication channels between tasks. If tasks connected by a delayed channel are then reordered (e.g. moving a downstream task one position further upstream), the corresponding channel delay is decremented by one period. Any remaining channel delay after the reordering can be implemented by pre-filling the channel with some initial tokens (if it is implemented as a FIFO) or by moving the delay back into the corresponding upstream/downstream task.

State Detection and Extraction

Task factorization describes the process of replacing a single task (e.g. in an MP model) with multiple separate task instances (e.g. in a SDF model), and can only be done if those instances are independent. This is not the case if the task has an internal state (such as internal delays or accumulators), since each execution of the task depends on its state in the previous execution. Therefore, only stateless tasks can be directly factorized.

The model-optimization unit 305 therefore provides a mechanism to detect which tasks have an internal state.

Figure 5:
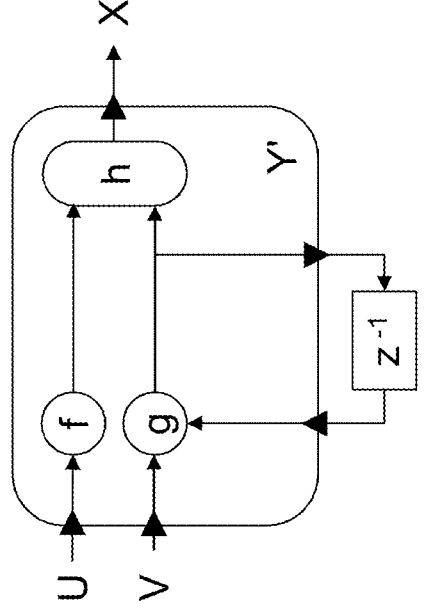
FIG. 5 is a schematic diagram of an exemplary task before (on the left) and after (on the right) state extraction.
Figure 5:
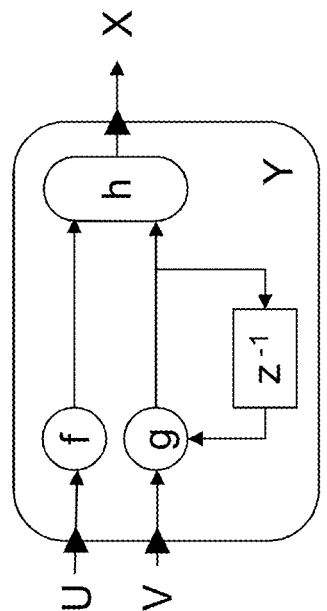

FIG. 5 shows an exemplary task Y that exhibits delayed feedback from an internal logic block h to an internal logic block g, meaning it is a stateful task. Once this task Y has been identified as a stateful task, the model-optimization unit 305 may modify the internals of the task Y to generate an equivalent task Y' having an additional output that inputs to itself (i.e. to another instance of the same task Y'), with a unit delay node on the communication channel between this output and input, as shown in the right of FIG. 5. In this way, the delay has been moved out of the task, and task Y' is now a stateless task which can be directly factorized. In other words, the state may be explicitly transferred between executions of the task, by sending the state as an additional signal from the task to another instance of itself through a channel with a unit delay. This involves a transformation of the task, capturing its state and sending it through a port. This may be done by the model-optimization unit 305 transforming the model, or by modifying the application code 304. Such state extraction and subsequent factorization may be applied to any number of tasks of the received MP model, when generating an equivalent SDF model.

After identifying DFT tasks, removing internal delays, and converting stateful tasks to stateless tasks, the model-optimization unit 305 and/or scheduling system 302 then has much greater capacity to reorder and factorize tasks within an internal SDF model representation of the received execution model 303, without changing the behaviour of the system. The model-optimization unit 305 relaxes the dependencies between tasks such that any appropriate reordering may be performed, to improve the efficiency of the SDF model ahead of, or during scheduling.

Graph Factorization and Dead Task Elimination

Factorization can transform a multi-periodic task graph 303 into a mono-periodic one, having more nodes (tasks), in which each node corresponds to a respective task instance representing one of the many task runs (TR). By analysing the periodicity of connected tasks, together with channel delay information, the model-optimization unit 305 determines which task runs connect with which.

Figure 6:
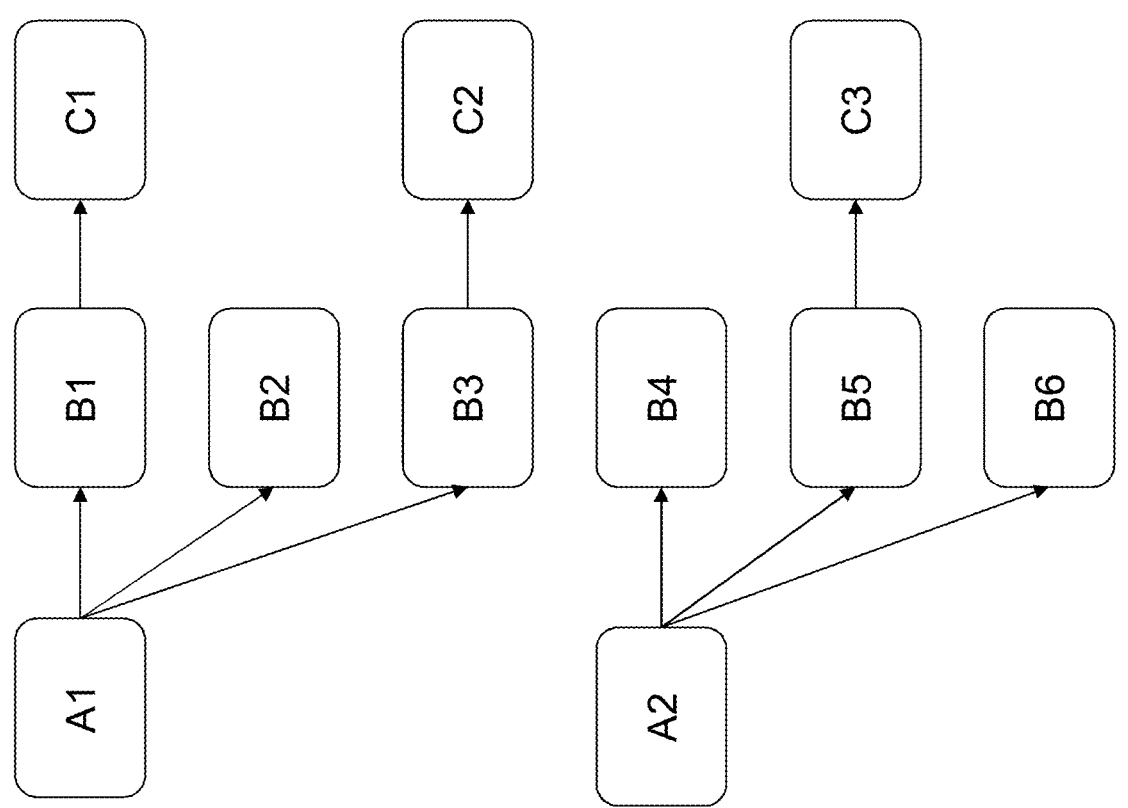
FIG. 6 is a schematic diagram of part of an execution model represented in multi-periodic (MP) form (to the left) and after factorization to synchronous dataflow (SDF) form (to the right)
Figure 6:
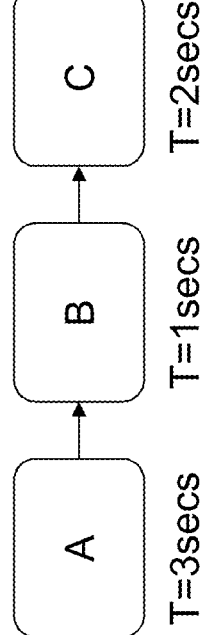

FIG. 6 provides an example of this. The left side represents part of an MP execution model, in which task A is run every 3 seconds, task B is run every 1 second, and task C is run every 2 seconds. Data flows from task A to task B, and from task B to task C. The right side represents part of a corresponding SDF execution model for the same three tasks, generated by the model-optimization unit 305, over a six-second time span. Task A is factorized in two task instances (A1, A2); task B is factorized into six task instances (B1-B6); while task C is factorized into three task instances (C1, C2, C3). Task factorization can result in a task run having to send data to multiple task runs (as is the case for A1 and A2), or to no task run (as is the case for B2, B4, and B6). This information is useful because a task instance with no side effects, no state and no outputs may be eliminated, reducing the processor load on the target system 312.

The model-optimization unit 305 therefore identifies such redundant (dead) tasks and eliminates them from the execution model, before outputting the final execution model to the scheduling system 302.

In summary, these various operations that may be performed by the model-optimization unit 305 can be very useful in automating model-based design techniques. They provide a set of tools that perform desirable transformations on MP models to increase the flexibility of their scheduling without affecting the behaviour of the system. This preservation of behaviour means that all tests and analysis performed in the original model (such as simulations) will still be valid for the transformed model, so they do not need to be repeated, reducing the production time. By automating the process, the production time is reduced as well. Dead task elimination reduces the number of tasks to be scheduled and the processor workload, resulting in faster implementations that are more likely to meet timing requirements (or that may run in cheaper hardware) and shorter scheduling optimization times.

TCM

As discussed above, TCMs can be useful to help predict the amount of contention that is likely to be present in a proposed schedule, or potential contention between a given pair of tasks when running simultaneously. A TCM receives at its input, the execution footprints of a set of tasks to be executed in parallel on a particular MCP architecture. Then, the TCM generates the WCETs of the tasks, taking into account the contention between given tasks. This data can then be used to find the best task mapping/scheduling that minimizes the total execution time.

In order to build an accurate TCM, several ingredients are required. First, detailed information about the interference channels on a given architecture must be provided, e.g., behaviour, read and write policy, maximum throughput, frequency, access concurrency, arbitration policies, or any other peculiarity that might affect concurrent access performance. As mentioned above, access to the specifications of the interference channels is very limited in commercial off-the-shelf (COTS) MCP devices, where information is usually not clearly documented by the manufacturer.

As a consequence, researchers and engineers looking to build an accurate TCM must develop ad-hoc microbenchmarks (µBenchmarks) that stress interference channels of a MCP to unveil and characterize their behaviour in detail. Such µBenchmarks generally operate by generating specific activities on shared resources, and as a result, they bring out multicore timing interference and, ultimately allow for analysis of the impact of interference channels on software timing. µBenchmarks can be selectively deployed to cause a configurable and quantifiable pressure on a specific resource, and in this regard, the selection of suitable µBenchmarks can be vital in producing an accurate TCM.

Every task to be analysed by the TCM and contended with another task must be previously instrumented or sampled to extract their shared resource usage pattern or footprint (either coarse or fine). To carry out this work, hardware performance monitoring counters (PMCs) must be read at several points of the task execution in isolation in order to generate an accurate resource footprint. PMCs are hardware counters built into modem processors that count the number of events of a certain type (e.g., number of instruction cycles or number of cache misses) at run-time.

Collecting all the required information can be tedious and usually extremely time consuming, requiring a great expertise on the platform to analyse. In addition, the process is not generic and requires very specific information that is tailored to a given architecture. This means that µBenchmarks, TCMs, and the set of PMCs to gather must be adapted every time a new platform is added. For example, if it is desired that a new COTS MCP is used, then this information must again be determined for that specific architecture, before certification for its use in safety critical uses can be achieved. This process is usually achieved by analytical models, which again are very time consuming, as well as requiring highly skilled operators to gather the required data, for each piece of hardware that is desired to be used.

However, it has been recognised that, to tackle the above outlined complexity of building TCMs by hand (using analytical models), Machine Learning (ML) may be utilised to generate a black-box TCM for a given platform to build an AI model that is able to accurately predict task's WCETs and the timing of each interference channel, given their behaviour in isolation.

From herein, to help with the understanding of how such a black box machine learning algorithm can be trained, and then used for inference, the following terms are defined, and selected:

Simultaneous tasks: given an architecture with c physical cores (either homogeneous or heterogeneous), the maximum number of tasks able to run simultaneously (provided only one task at a time runs on a single core) will be ntasks=c, and therefore $1 < ntasks \leq c$.

PMCs: a set of Performance Monitoring Counters $PMC_i$; $i=\{1, \ldots, N\}$ that are chosen from the available PMCs in the architecture. To accurately measure the degree of contention that is experienced by certain tasks, the selection of PMCs that are monitored should strongly correlate to those that are triggered when the interference channels are accessed, either on read or write operations. Whilst monitoring all PMCs might give a more complete and accurate picture of all possible sources of contention, a reduced set of PMCs will help to the ML TCM system to converge faster.

As a default, the instrumentation characterization can gather all PMCs that are available on the platform. From these, if desired, a subset of PMCs may be selected, in order to help the ML TCM system to converge faster. For example, feature selection techniques to select a narrow subsection of the most relevant PMCs may be performed. In this way, the PMCs that are most useful to characterize the application behaviour can be effectively and efficiently selected. Additionally, or alternatively, the software or hardware architecture may be analysed to deduce which PMCs could be potentially useful. Such an analysis may also be optimized using the data that is collected.

µBenchmarks: a set of µBenchmarks $B_j$; $j=\{1, \ldots, M\}$; are defined and selected. As outlined above, these synthetic benchmarks will stress certain interference channels of the architecture in an isolated way (e.g. L1 (caches that are local to a core), LLC (last level cache) and buses). With each µBenchmark, the associated $PMC_n$ to that channel is gathered. The obtained hardware counters (PMCs) are then used to characterize the behaviour of the interference channel under ideal, and then contention conditions as outlined below. Each platform has a selection of µbenchmarks that are be available for said platform. In order to obtain a wide spectrum of datasets that can be used later on to generate the ML-based TCM, all of the benchmarks may be executed and contended with one another. However, it would be appreciated that useful data may still be obtained from a subset of available µbenchmarks.

Pairing Scenarios: a set of Scenarios $S_k(B_{j_1}^1\| \ldots \| B_{j_{ntasks}}^{ntasks})$; k={1, ..., P}; $j_1, \ldots, j_{ntasks}$={1, ..., M} are generated by pairing up to ntasks of µBenchmarks together, and extracting the resulting $PMC_n$. In the above example, where a quad core processor is used, then 4 µBenchmarks must be paired together for each scenario. In this way, a reference to a pairing scenario does not necessarily refer to the pairing of only two tasks, but rather a set of ntasks together, depending on the number of tasks that may be simultaneously executed in the multi-processor system.

For example, the function $S_k(B_\alpha^1\|B_\beta^2\|B_\gamma^3\|B_\delta^4)$ denotes the k pairing scenario in a quad-core architecture (ntasks=c=4), where $B_\alpha$, $B_\beta$, $B_\gamma$ and $B_\delta$ µBenchmarks are executed simultaneously, so as to contend with each other on consecutive cores. In this example, the '∥' operator denotes the contend operation between a set of tasks. The maximum number of pairing scenarios (P) for ntasks and M µBenchmarks are determined by a k-combination with repetition in a homogeneous platform, $$P_M^{ntasks} = C_{M+ntasks-1}^{ntasks} = \binom{M + ntasks - 1}{ntasks} = \frac{(M + ntasks - 1)!}{ntasks!(M - 1)!}$$

If the architecture is heterogeneous or not symmetric (in terms of bus interconnection) and the core placement of the µBenchmarks is relevant, P will be determined by a k-permutation with repetition, $$P_M^{ntasks} = M^{ntasks}$$

As would be understood, in order to produce a ML-based TCM, it is necessary to train a ML model using a known range of inputs and their corresponding outputs, such that it may subsequently infer outputs for a given number of inputs. Therefore, the following steps may be undertaken:

1. Execution of each $B_j$ µBenchmark in isolation to extract ideal characteristic footprints.
2. Execution of the $S_k$ pairing scenarios to obtain contention behavior of the interference channels on the execution time.
3. Training of the Machine Learning Task Contention Model using output data from step 1 ($PMC_i^{B_j}$ measures in isolation) and step 2 ($\Delta T^{B_j}$) as training inputs.
4. Inference of the Machine Learning Task Contention Model to validate the training error with actual execution tasks inputs, as opposed to surrogate µBenchmarks tasks.

As would be appreciated, these four steps can define the lifecycle of the machine learning model. Steps 1 to 3 refer to the training of a model, such that it may then be used to achieve step 4, which is an inference phase, where the model may be validated by comparing the predicted delay from the model to the actual measured delay associated with real task inputs. The trained model may then be put into action with defined inputs to produce an actionable output—e.g. a TCM for a given MCP. The TCM may then subsequently be used for scheduling and mapping, as outlined above. Each step outline above is detailed below, by way of example.

µBenchmark Execution in Isolation

Figure 1:
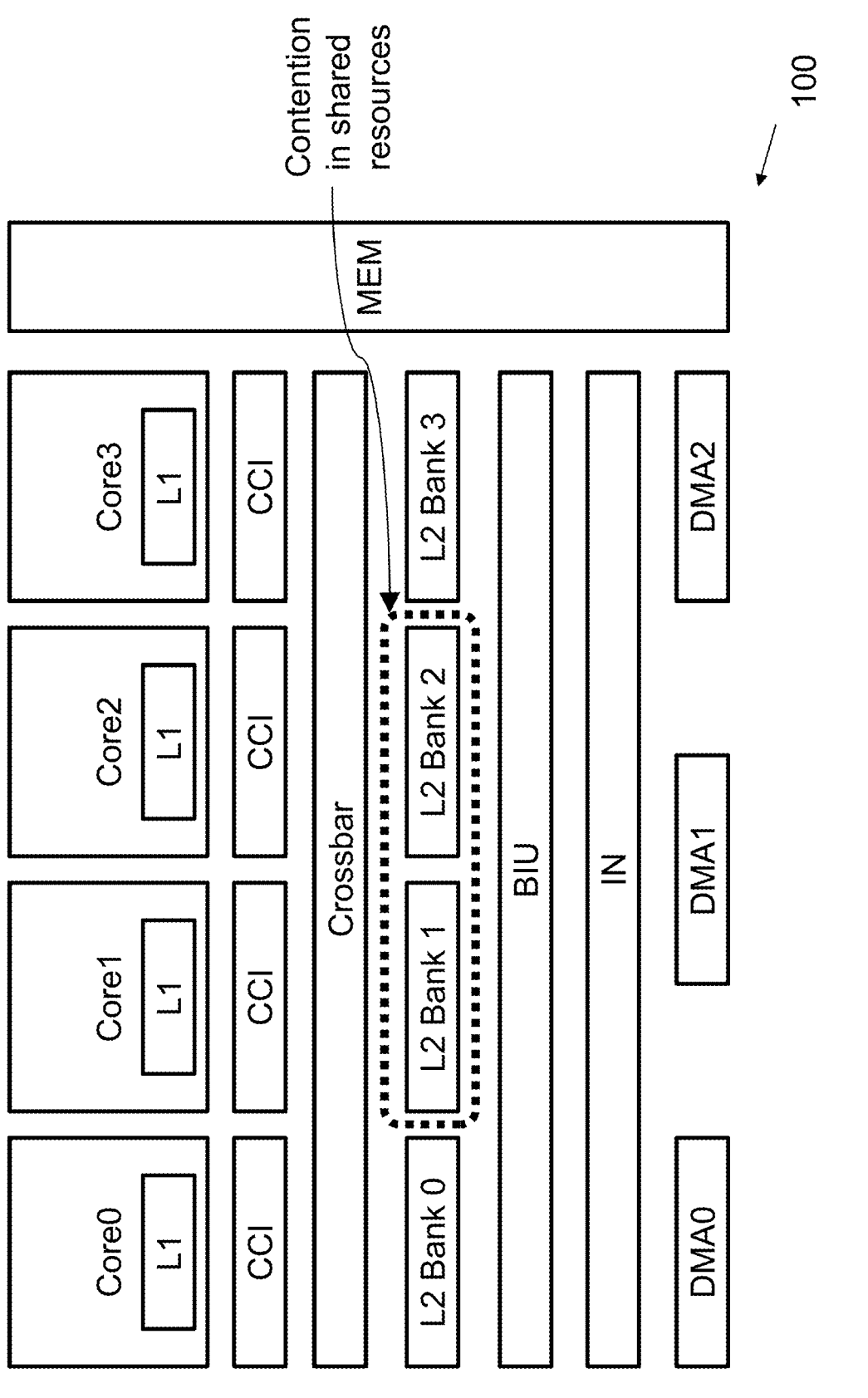
FIG. 1 is a schematic diagram of an example MPSoC with multiple computational units, shared memory hierarchies and interconnection buses.

In the first step, all selected µBenchmarks may executed in isolation and in ideal conditions to extract their characteristic footprints. In order to achieve this, the target architecture must be analysed carefully to identify the PMCs associated with interference channels. Such an analysis can identify the interference channels that are present in the MCP in its current hardware configuration. Taking the architecture of FIG. 1 for example, L2 may be enabled/disabled, as may any other optional device that can be disabled.

Only those performance metrics that capture the contention of the interference channels should be considered. These may be chosen by selecting suitable PMCs to measure from an analysis of the target architecture and the identification of a specific interference channel, as above. Additionally or alternatively, it may be desirable to collect all possible PMCs and then perform analysis on the gathered date to identify the most pertinent PMCs, thereby reducing the number of variables. In addition, the metrics gathered should be represented as a function of time, as can be seen in FIG. 7. FIG. 7 shows the PMCs that are gathered at 8 different time points for two different tasks, Task 1 in graph 410, and Task 2 in graph 420. These graphs plot a PMC count per task at various timepoints (t1 to t8) in their execution, from the beginning to the end of the task (when run in isolation).

In order to collect such metrics, the instrumentation of the µBenchmarks with certain granularity (i.e. that complete a certain amount of work) should be used. Traditionally, performance tools only automatically instrument the routine entry and exit points of an application, and therefore only aggregates data when the selected routines starts or stops. On the other hand, manual instrumentation adds callbacks to monitoring functions at particular applications spots (i.e. at certain points during the execution of a task).

Whereas the automatic instrumentation (i.e. the sampling at the start and finish of a task) adds coarse information, the manual instrumentation involves additional effort and can incur on overhead for fine grain measures. In order to solve this issue, a sampling mechanism should be used to collect punctual performance measurements at a variable monitoring frequency (e.g. small ($\Delta t$)) with a low overhead.

The frequency of the PMC measurements may be varied (i.e. sampling with a shorter time period between each of t1 to t8). In theory, the finer the PMC measure the better. A fixed and small $\Delta t$ monitoring frequency (i.e. time between PMC measures) would allow for the capturing of task behaviour with more detailed results. To do so with a low overhead, and as explained before, a smart sampling mechanism for fine-grain instrumentation is required.

Pairing Scenarios Execution

Once all of the selected µBenchmarks have been executed in isolation and their PMCs have been collected, all possible pairing scenarios ($S_k$), as discussed above, may then be executed, to measure the effect of contention that results from the simultaneous execution of the tasks over the interference channels and the variability on their typical execution time (ST). This can be seen in FIG. 8, which illustrates the contention effect produced due to the execution in parallel of Task 1 and Task 2, which is in turn visualised in graph 500.

In order to obtain a reliable footprint of a task, it must be obtained in isolation. This discards any potential variation due to the non-deterministic behaviour when more than a single task is executed in parallel. Therefore, tasks profiles (footprints) should be always gathered in isolation to avoid variability in measurements and no collateral effects.

FIG. 8, shows the execution in parallel of two different μBenchmarks (task 1 and task 2) within a certain pairing scenario, and how it produces contention. For a given architecture, such as the one illustrated in FIG. 1, a certain PMC will have a maximum throughput 510 without contention on shared resources within the architecture. Whilst the separate execution of the tasks will remain under this maximum throughput, and therefore will allow for a timely completion of each task, when run in parallel, this throughput may be exceeded (i.e. when the sum of the PMCs of each individual task exceeds the maximum throughput). As a result of the exceeding of the maximum throughput, an increase of the average execution time of Task 1 and Task 2 ($\Delta T_1$, $\Delta T_2$) is produced as a consequence of the interference, as illustrated in FIG. 8. As a result, whilst in isolation both tasks finish by t8, when they are run in parallel, Task 1 takes an additional time $\Delta T_1$, and Task 2 takes an additional time $\Delta T_2$.

This information may be given by a TCM and used to a calculate the actual WCET of a given pair of tasks that are concurrently operating. The actual WCET of task 1 and task 2 in this example may be the WCET of task 1 and task 2 when executed in isolation, plus $\Delta T_2$ which is the largest delay resulting from the contention. This actual WCET is the time that needs to be considered in safety/time critical applications, when scheduling/mapping tasks.

Of course, whilst the example of FIG. 8 shows only 2 tasks running in parallel, it would be appreciated that a similar process may occur for ntasks running in parallel on c cores.

The above interference that results from the simultaneous completion of any given pair of tasks can be measured by monitoring the selected PMCs, and collected with monitoring tools. The gathered information may then be used for training the TCM.

Training of the Machine Learning Task Contention Model

With the above information (the ideal execution of μBenchmarks in isolation and the recording of their associated PMCs as a function of time, and the contention behaviour obtained from the concurrent execution of task pairs), a Machine Learning Task Contention Model, such as the example seen in FIG. 9, may then be trained. Specifically, the model may be trained with the following:

As inputs: Performance Monitoring Counters metrics $PMC_i$; i={1, . . . , N} from each μBenchmark used as a contender $(B_{j_1}{}^1 \| \ldots \| B_{j_{ntasks}}{}^{ntasks})$ on the pairing scenario $(S_k)$. The input array ($\vec{x}$) is composed of as many entries as there are PMCs selected to accurately characterize the μBenchmarks and the number of tasks to deploy on the architecture $(PMC_{\{1 \ldots N\}} \times ntasks)$.

As outputs: Variability of time observed ($\Delta T_1$, . . . , $\Delta T_{ntasks}$) during the parallel execution of the pairing scenario $S_k(B_{j_1}{}^1 \| \ldots \|_{j_{ntasks}}{}^{ntasks})$ for each of the contenders. The variability on their typical execution time may be expressed in percentage increase (%), or any other metric, such as a number of processor cycles. For instance, a $\Delta T_{task\,a}$=1.1 will represent an increase of 10% over its typical execution time for task a.

A diagram of said input and outputs for the neural network topology proposed for the ML-based TCM is shown in FIG. 9. As can be seen, the number of PMCs used to characterize the tasks and the number of tasks to deploy (ntasks) will set the topology.

An example training loop is shown in FIG. 10. As can be seen the training process may be composed of two main loops: a first loop iterating over different k pairing scenarios $(P_M{}^{ntasks})$ whereas a second loop iterates over all $\Delta t_i$, i.e. each of the PMC samples that have been gathered for each μBenchmark in isolation, as well as in contentious conditions.

Inference of the Machine Learning Task Contention Model

Once the ML-based TCM has been trained and the error shown is low, the trained model may then be ready to be used to predict WCETs for contending tasks.

In order to proceed with the inference of the model, an example flowchart of the inference process may be utilised, as seen in FIG. 11. This figure shows the execution flow performed to compute the contention of two tasks (TCM (task a‖task b)).

First, the interference channel footprints of task a and task b are manually extracted in isolation from the given architecture, in order to obtain all required inputs for the trained ML-based TCM.

Then, the model is iteratively inferred in a loop for each PMC sample of $\Delta t$ size. Within this loop, the increase of the execution time associated with each $\Delta t$ due to contention is aggregated in order to generate the final $\Delta T$ of each contending task. In this way, for each $\Delta t$, a corresponding increase in execution time is inferred and summed so as to give a final delay $\Delta T$ that results from the parallel computation of the contending tasks.

By providing a faster way of generating specific TCMs for a given MCP, the time required for certification of such a system may be vastly reduced. A ML-based TCM may allow for a fast characterization of interference channels. The actual WCET may be estimated earlier, thereby improving the TCM's accuracy and reducing its uncertainty. The certification process may be accelerated by proposing solutions closer to the final one and decreasing the number of iterations. Finally, once the ML-based TCM is created for a given architecture, only task behaviour in isolation is required, which greatly reduces the amount of data that needs to be collected so as to produce a TCM.

Further, the reduction in time needed to produce a TCM may accelerate the hardware characterization, and thereby ease porting. As outlined above, the mapping and scheduling of tasks to cores in a MCP can be done automatically for new platforms. Software tools can use the TCM to get insights about how to do it in an efficient way. Therefore, such a TCM allows for the much more rapid and effective configuration of a new platform to comply with software requirements and certification.

It will be appreciated by those skilled in the art that the disclosure has been illustrated by describing one or more specific examples, but is not limited to these examples; many variations and modifications are possible within the scope of the accompanying claims.

The invention claimed is:

1. A computer-implemented method of scheduling a plurality of tasks for execution by a multi-processor system, the method comprising:

generating a first schedule that assigns each task of the plurality of tasks a time window and a processor of the multi-processor system;

querying a contention model for the multi-processor system to determine a contention delay for the assignment of tasks to processors according to the first schedule; and using the contention delay determined from the contention model to generate, from the first schedule, a revised schedule that assigns each task a time window and a processor of the multi-processor system, wherein the revised schedule is determined in dependence on the determined contention delay.

2. The computer-implemented method of claim 1, wherein the first schedule is a schedule that does not account for contention delays in the multi-processor system.

3. The computer-implemented method of claim 1, wherein the revised schedule is a final schedule, and the method comprises storing or outputting the final schedule for use in executing the plurality of tasks on the multi-processor system.

4. The computer-implemented method of claim 1, comprising iteratively generating a succession of revised schedules that assign each task a time window and a processor of the multi-processor system, wherein each schedule is generated from a respective preceding schedule in the succession by:

querying the contention model to determine a respective contention delay for the assignment of tasks to processors according to the preceding schedule; and using the determined contention delay to generate the schedule in dependence on the determined contention delay.

5. The computer-implemented method of claim 4, comprising determining whether each generated schedule accounts for all contention delays that arise from the schedule, and iteratively generating revised schedules until a schedule is generated that accounts for all contention delays.

6. The computer-implemented method of claim 5, comprising storing or outputting a revised schedule that accounts for all contention delays as a final schedule for use in executing the plurality of tasks on the multi-processor system.

7. The computer-implemented method of claim 1, wherein the contention model models any one or more of cache contention, volatile-memory contention, non-volatile memory contention, bus contention, and peripheral contention, in the multi-processor system.

8. The computer-implemented method of claim 1, wherein the contention delay determined by the contention model represent a worst-case execution time.

9. The computer-implemented method of claim 1, wherein querying the contention model comprises querying a contention model system that comprise the contention model and a cache for caching queries made to the contention model and responses from the contention model.

10. The computer-implemented method of claim 9, wherein the contention model system is configured to determine whether a received query has been cached and to respond with a contention delay retrieved from the cache when the query is determined to be cached.

11. The computer-implemented method of claim 1, wherein plurality of tasks are tasks of a real-time software application.

12. The computer-implemented method of claim 1, wherein the multi- processor system is a multi-core processor of an avionics system.

13. A computer system for scheduling a plurality of tasks for execution by a multi-processor system, wherein the computer system is configured to perform the method of claim 1.

14. Computer software comprising instructions which, when executed on a computer system, cause the computer system to schedule a plurality of tasks for execution by a processor system, by performing the method of claim 12.

15. Computer software comprising instructions for executing a plurality of tasks on a multi-processor system according to a schedule determined using the method of claim 1.

\* \* \* \* \*